H. L. FISHER.
FRICTION TRANSMISSION MECHANISM.
APPLICATION FILED MAR. 18, 1918.
1,326,189.
Patented Dec. 30, 1919.
2 SHEETS—SHEET 1.
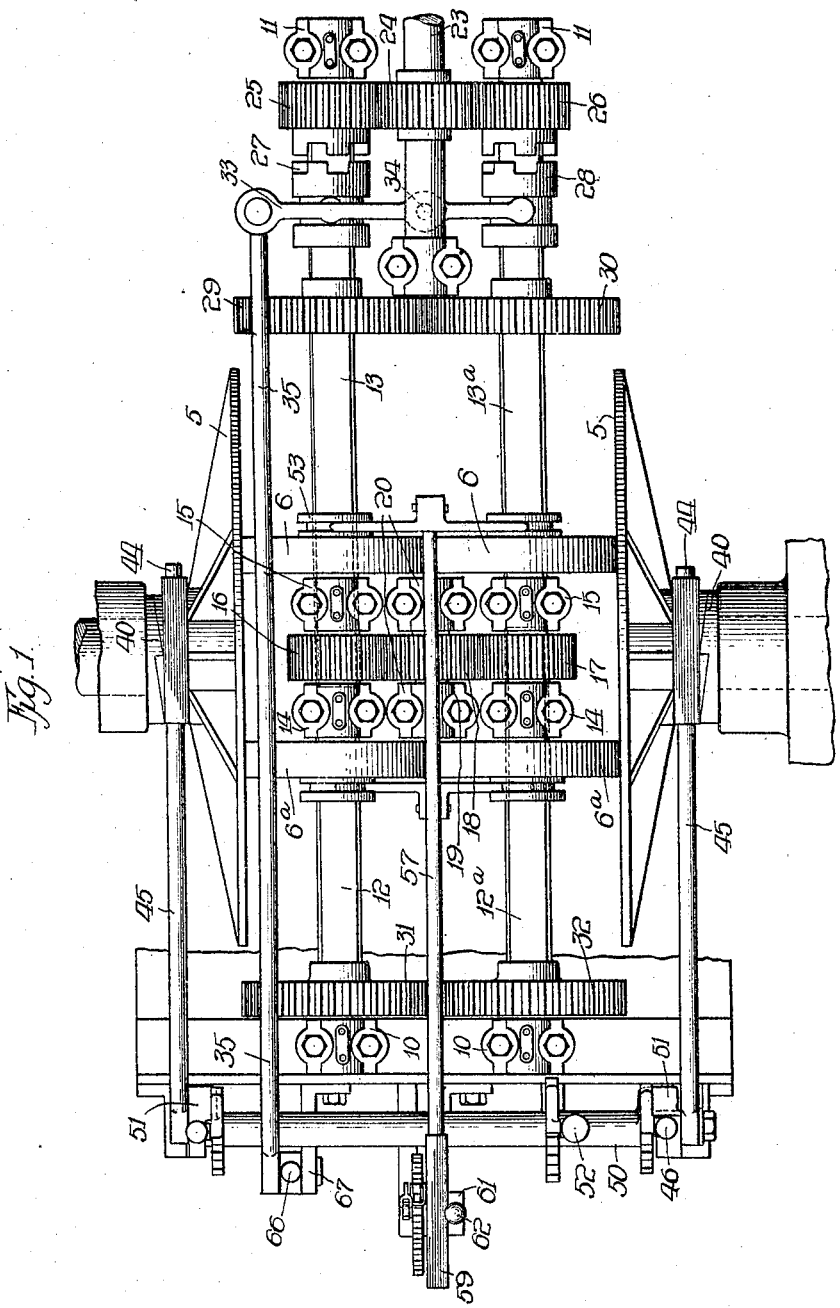
Witness:
Inventor:
Harry L. Fisher
By Rector Hibben Davis Macauley
His Attys.

H. L. FISHER.
FRICTION TRANSMISSION MECHANISM.
APPLICATION FILED MAR. 18, 1918.
1,326,189.
Patented Dec. 30, 1919.
2 SHEETS—SHEET 2.
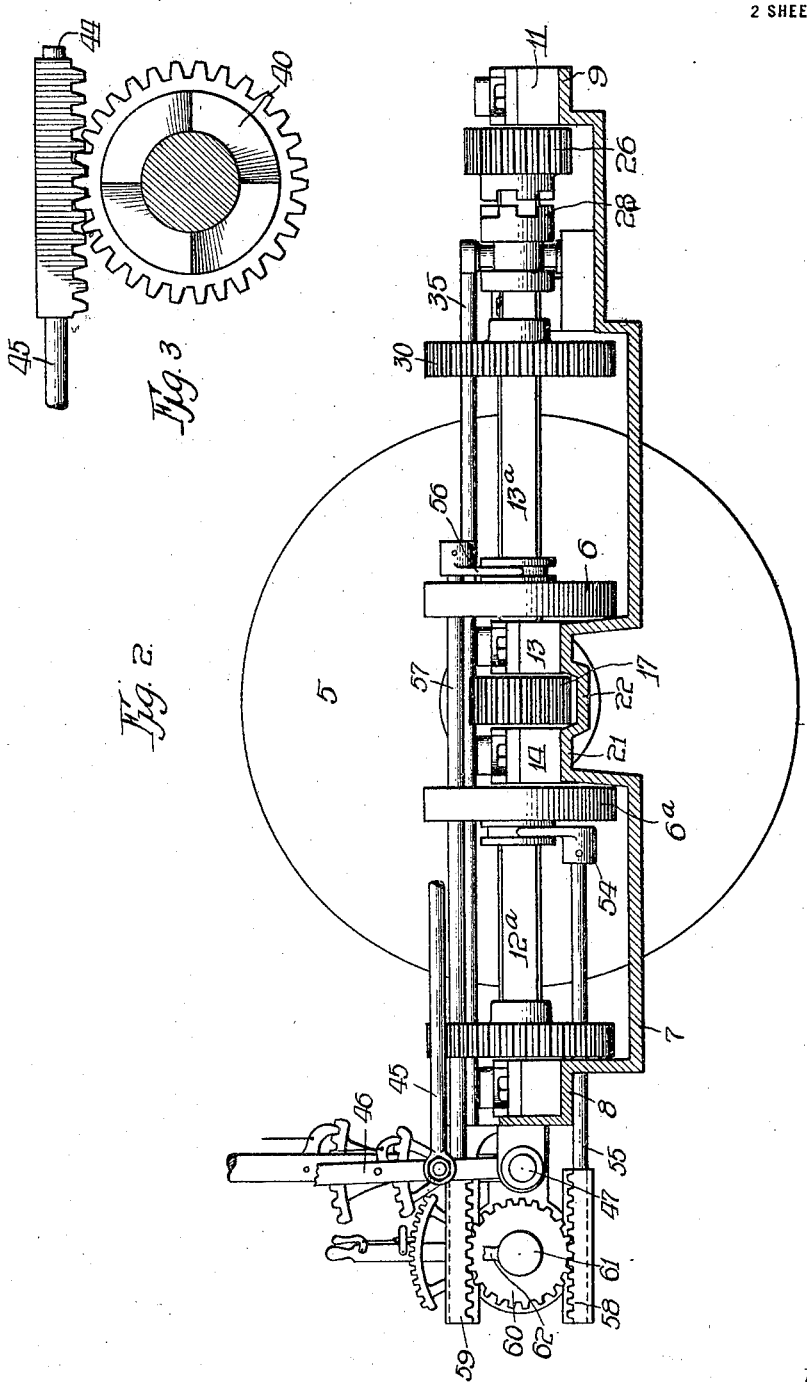

UNITED STATES PATENT OFFICE.

HARVEY L. FISHER, OF CHICAGO, ILLINOIS, ASSIGNOR TO THE DONALDSON & FISHER COMPANY, OF CHICAGO, ILLINOIS, A CORPORATION OF ARIZONA.

FRICTION-TRANSMISSION MECHANISM.

1,326,189.     Specification of Letters Patent.     Patented Dec. 30, 1919.

Application filed March 18, 1918. Serial No. 223,025.

*To all whom it may concern:*

Be it known that I, HARVEY L. FISHER, a citizen of the United States, residing at Chicago, in the county of Cook and State of Illinois, have invented certain new and useful Improvements in Friction-Transmission Mechanism, of which the following is a specification.

My invention has for its object to provide improved friction transmission for use more particularly in connection with tractors, trucks and the like though, as will appear from the following specification, it has a wide range of application for other purposes. The object of the invention is a simplified form of friction transmission of great flexibility and power, and in which the stresses are balanced so that friction in the bearings of the parts is equalized and reduced to a minimum. My improved device is relatively inexpensive to manufacture and repair, and is durable and efficient. In the accompanying drawings I have illustrated and in the following specification described a preferred form of my invention. It is to be understood, however, that the specific disclosure is for the purpose of exemplification only, and that the scope of the invention is defined in the following claims in which I have endeavored to distinguish it from the prior art so far as known to me, without, however, relinquishing or abandoning any portion or feature thereof.

Referring now to the drawings accompanying and forming a part of this application, Figure 1 is a plan view of a preferred form of transmission mechanism embodying my invention; and Fig. 2 a section on the vertical plane of the line 2—2 of Fig. 1; and Fig. 3 is a vertical section on an enlarged scale of a detail.

Each part is identified by the same reference character wherever it appears in the several views.

My invention provides a form of transmission mechanism in which a pair of friction disks are attached to the parts to be driven, e. g. the wheels of a truck or tractor, and the engine for driving the vehicle is connected to the disks through the medium of friction rolls which are arranged in pairs between said disks, the respective pairs being upon opposite sides of the common axis of the disks and adjustable toward and away from said axis in order to regulate the speed and power. Referring to the drawing, I have shown the friction disks 5—5 as of cast metal, and it is to be understood that in case of a truck, tractor, or other vehicle the respective disks are connected to the draft wheels thereof. The rolls 6, 6$^a$, which may be of fiber or other rigid material capable of frictionally engaging the disks, are mounted in pairs between the disks and on opposite sides of the common axis thereof, the rolls 6, 6, being on one side of the axis and engaging each other and the respective disks, and the rolls 6$^a$, 6$^a$, being on the opposite side of the axis of the disks and engaging each other and the respective disks. The disks 6 are shown on the forward side of the device and are adjustable along their respective shafts 13, 13$^a$ toward and from the axis of the disks. The drive shaft is shown at 23 arranged between the forward shafts 13, 13$^a$, and provided with a gear 24 which is in engagement or mesh with gears 25, 26 loose on the shafts 13, 13$^a$, respectively, and consequently free to revolve with respect thereto and to be alternatively locked to said shafts by means of clutches 27, 28 which are shown as of a common type. The lever 33 is pivoted at 34 intermediate the clutches and engages the latter so that its movement in one direction throws clutch 27 into engagement and its movement in the opposite direction throws clutch 28 into engagement, but in its intermediate position both of the clutches are out of engagement. With clutch 27 in engagement the roll 6 on shaft 13 is directly driven and may frictionally drive the similar roll on shaft 13$^a$, and on the other hand, with the clutch 28 in engagement, the roll on the shaft 13$^a$ may drive the roll on the shaft 6. I prefer, however, to positively drive the one shaft from the other, and for this purpose provide shaft 13 with gear 29 and shaft 13$^a$ with gear 30, said gears being of a diameter substantially equal to the disks 6, 6, at pitch line, and meshing with each other. The rolls 6$^a$, 6$^a$, are mounted upon the shafts 12, 12$^a$, which are respectively coaxial with shafts 13, 13$^a$, but revoluble independently of the latter. In order to drive shafts 12, 12ª from shafts 13, 13ª respectively and in the opposite direction, shaft 13 extends slightly beyond the axis of the disks and is provided substantially in the line of the axis with a gear 16. Similarly the shaft 12ª extends beyond the line of the axis of the disks and is provided with a gear 17 substantially in said line. The gear 18 is mounted intermediate said gears 16, 17, and is in mesh therewith, whereby the shaft 12ª is always driven in the same direction as the shaft 13 and driven from the latter. Shafts 12, 12ª are also provided with gears 31, 32 similar to 29, 30 on shafts 13, 13ª, and also having the function of securing reverse rotation between shafts 12, 12ª.

With the construction just described, it will be clear that when the clutch 27 is thrown in, shafts 13, 13ª will be driven in opposite directions and shaft 12ª will be driven in the same direction from shaft 13 through the gearing 16, 18, 17. Shaft 12 will be driven in an opposite direction from shaft 12ª through gears 32, 31, so that the coaxial gears will be driven in opposite directions, which is of course essential to the proper rotation of the disks. It also follows from the construction described that the rolls of each pair on the same side of the axis of the disks, as for example rolls 6ª, 6ª, rotate in opposite directions so that the disks 5, 5, rotate in the same direction.

Any suitable framework may be used to support the machine elements described. I have shown, however, a casting 7 for this purpose which is provided at its front and rear ends respectively with flanges 8, 9, and intermediate its ends with a raised portion 21, said flanges and raised portion forming seats for bearings for the shafts 12, 12ª, 13, 13ª. Bearings 10 on the rear flange 8 receive the rear ends of shafts 12, 12ª, and bearings 14 upon the intermediate raised portion of the frame 27 receive the forward ends of the rear shafts 12, 12ª. Similarly, the flange 9 receives the bearings 11, 11 for the front ends of shafts 13, 13ª, while the bearings 13, 15 receive the rear ends of said forward shafts. Bearings 2P on the intermediate raised portion of the frame support the shaft 19 of gear 18. The middle of the raised portion 21 of the frame is dropped at 22 to provide clearance for the gears 16, 18, 17.

The disks 5, 5, are preferably shiftable toward and from each other so that they or either of them may, when desired, be backed off out of operative contact with the frictions rolls 6, 6ª. In order to control the position of the disks, I provide the bearing for the axle or arbor of each disk with a ratchet cam face 40 and intermediate said face and the hub of the disk, mount a collar 41 which is independently revoluble about the said arbor and provided with cam faces 42 coöperating with the similar faces of said bearing and with a gear 43 which gear coöperates with a rack 44 upon an operating rod 45. The rods 45 are in turn connected respectively to hand levers 46 which are journaled at 47 to the supporting frame 7 of the mechanism. Obviously by shifting either handle the corresponding disk can be thrown into engagement with the friction rolls through the medium of the rods 45, racks 44 and cam collars 41. Suitable means, as the stationary racks 48 and pawls 49 carried by said hand levers may be provided for securing the cam collars in adjusted position. In many instances it is desirable to control the cam collars together, and for this purpose I provide a transverse shaft 50 with cam portions 51, 51 in position to engage said levers, and a handle 52 for operating said shaft. By oscillating the shaft through its handle, the hand levers 46 may be operated together to adjust the cam collars.

In order to adjust the friction rolls 6, 6ª to regulate the speed and power of the machine, I provide each said roll with a grooved hub 53, and the grooves of the rolls 6ª are engaged by a common shifting fork 54 which is operated by a rod 55, while the rolls 6 are adjusted by means of a similar common shifting fork 56 engaging the grooves in their respective hubs. The latter fork is carried by a rod 57 which is above the plane of said collars, while the previously mentioned rod 55 is below said plane. Said roll-adjusting rods are provided respectively with racks 58, 59 which engage the intermediate gear 60 on opposite sides so that as one rod is reciprocated in one direction, the other necessarily moves in the opposite direction. Gear 60 is mounted on a shaft 61 provided with a handle 62 for oscillating it. Any suitable means may be employed for locking the shaft in adjusted position, as for example the stationary rack 63 and pawl 64 mounted on arm 65 on said shaft.

The operation of my transmission mechanism will now be readily understood. When the vehicle is to be driven forward, one of the clutches, e. g. clutch 27, is thrown into engagement by shifting the rod 35, and consequently lever 33. For this purpose said rod is attached to the hand lever 66 which is pivoted at 67 to the frame. With such clutch in engagement rolls 6, 6, will be turned in opposite directions respectively, and rolls 6ª, 6ª, will be turned in opposite directions respectively, coaxial rolls likewise being turned in opposite directions. Thus the disks will be revolved in the same direction and the vehicle propelled in the direction desired. To reverse the direction of movement of the vehicle it is only necessary to shift the clutches to the opposite position through the medium of the handle 66. I have assumed the disks 5—5 both to be pressing against the friction rolls. It is sometimes desirable to turn a machine of this character in very short compass. For this purpose I manipulate one of the handles 51 to release the corresponding disk from contact with the friction rolls 6, 6ª. This disk is then idle on its shaft and the other disk being driven as usual, the vehicle pivots about the idle wheel. To cause the vehicle to turn in the opposite direction, it is only necessary to bring the idle disk into contact with the friction rolls and relieve the other disk. This pivoting movement can not only be performed on either wheel, but can be performed either forwardly or rearwardly by reversing the clutches. The rolls, 6 6ª are always equally distant from the axis of the disks, and by operating the handle 62 to rotate the gear 60, said rolls may be adjusted toward and from the center of the disk to vary the speed and power. When the machine is to be stopped it can be done without stopping the engine by oscillating the shaft 50 and thereby through the shouldered arms 51 thereon oscillating the handles 46 to shift the rotary cams and permit the disks to move away from the fiber rolls. In order to change the speed of the device it is only necessary to manipulate the handle 62 to shift the friction rolls toward or from the center of the disks accordingly as a higher or lower speed is desired.

My improved friction transmission has the advantages of great flexibility both as to speed and steering described, but is of unusual power and lasting quality because of the balanced transmission of power to the disks. Furthermore, by attaching the disks to the axles of the wheels and driving them from the friction rolls the latter are saved from flattening, which frequently occurs in machines in which the friction rolls are driven from the disks because the latter are sometimes arrested by the wheels encountering an unusual obstacle of such magnitude as to cause slip between the disks and rolls when the continued movement of the disks grinds off a flattened space on the rolls. Furthermore, by the arrangement shown when great tractive effort is desired at the expense of speed it may be accomplished by moving the friction rolls outward toward the periphery of the disks where the greatest leverage may be had.

I claim:

1. In a friction transmission mechanism, a pair of coaxial independently journaled friction disks connected respectively to parts to be driven, pairs of friction rolls between said disks and on opposite sides of the axis thereof, the members of each pair bearing upon each other and adapted to bear upon the respective disks, means for driving the rolls, and means for adjusting the disks toward and from each other.

2. In a friction transmission mechanism, a pair of coaxial independently journaled friction disks connected respectively to parts to be driven, pairs of friction rolls between said disks and on opposite sides of the axis thereof, the members of each pair bearing upon each other and adapted to bear upon the respective disks, means for driving the rolls, and means for independently adjusting the respective disks toward and from each other.

3. In a friction transmission mechanism, a pair of coaxial independently journaled friction disks connected respectively to parts to be driven, pairs of friction rolls between said disks and on opposite sides of the axis thereof, the members of each pair bearing upon each other and adapted to bear upon the respective disks, means for driving the rolls, rotary cam collars coaxial with and bearing against said disks, stationary cams with which the respective rotary cams coöperate and means for rotating the cams.

4. In a friction transmission mechanism, a pair of coaxial friction disks spaced apart and connected respectively to parts to be driven, pairs of friction rolls between said disks and on opposite sides of the axis thereof, the members of each pair bearing upon each other and adapted to bear upon the respective disks, a pair of shafts on which the members of one pair of rolls are respectively mounted, a driving shaft, means for alternatively connecting the shafts of said pair to the driving shaft, and a second pair of shafts on which the members of the other pair of rolls are respectively mounted.

5. In a friction transmission mechanism, a pair of coaxial friction disks spaced apart and connected respectively to parts to be driven, pairs of friction rolls between said disks and on opposite sides of the axis thereof, the members of each pair bearing upon each other and adapted to bear upon the respective disks, a pair of shafts on which the members of one pair of rolls are respectively mounted, a driving shaft, means for alternatively connecting the shafts of said pair to the driving shaft, a second pair of shafts on which the members of the other pair of rolls are respectively mounted, and means for driving the second pair of shafts from the first.

6. In a friction transmission mechanism, a pair of coaxial friction disks spaced apart and connected to parts to be driven, a pair of rolls between the disks on one side of the axis thereof the members of the pair bearing on each other and on the respective disks, a pair of parallel shafts on which the respective rolls are mounted, means for driving one of said shafts, and a second pair of friction rolls between the disks on the other side of the axis thereof the members of the last said pair bearing on each other and on the respective disks.

7. In a friction transmission mechanism, a pair of coaxial friction disks spaced apart and connected to parts to be driven, a pair of rolls between the disks on one side of the axis thereof the members of the pair bearing on each other and on the respective disks, a pair of parallel shafts on which the respective rolls are mounted, means for driving one of said shafts, a second pair of friction rolls between the disks on the other side of the axis thereof the members of the last said pair bearing on each other and on the respective disks, a second pair of shafts on which the members of the second pair of rolls are respectively mounted and means for driving the second pair of shafts from the first pair of shafts.

8. In a friction transmission mechanism, a pair of coaxial friction disks spaced apart and connected respectively to parts to be driven, a pair of friction rolls between the disks on one side of the axis thereof the members of said pair of rolls bearing on each other and on the respective disks, a pair of parallel shafts on which the respective rolls are mounted, a drive shaft, means for connecting either of the shafts of said pair to said drive shaft, and a second pair of rolls between the disks on the other side of the axis thereof the members of said second pair of rolls bearing on each other and on the respective disks.

9. In a friction transmission mechanism, a pair of coaxial friction disks spaced apart and connected respectively to parts to be driven, a pair of friction rolls between the disks on one side of the axis thereof the members of said pair of rolls bearing on each other and on the respective disks, a pair of parallel shafts on which the respective rolls are mounted, a drive shaft, means for connecting either of the shafts of said pair to said drive shaft, a second pair of rolls between the disks on the other side of the axis thereof the members of said second pair of rolls bearing on each other and on the respective disks, the shafts of the second pair being coaxial respectively with the shafts of the first pair.

10. In a friction transmission mechanism, a pair of coaxial friction disks spaced apart and connected respectively to parts to be driven, a pair of friction rolls between the disks on one side of the axis thereof the members of said pair of rolls bearing on each other and on the respective disks, a pair of parallel shafts on which the respective rolls are mounted, a drive shaft, means for connecting either of the shafts of said pair to said drive shaft, a second pair of rolls between the disks on the other side of the axis thereof the members of said second pair of rolls bearing on each other and on the respective disks, the shafts of the second pair being coaxial respectively with the shafts of the first pair, and means for driving the shafts of the second pair from the first pair.

11. In a friction transmission mechanism, a pair of coaxial friction disks spaced apart and connected respectively to parts to be driven, a pair of friction rolls between the disks on one side of the axis thereof the members of said pair of rolls bearing on each other and on the respective disks, a pair of parallel shafts on which the respective rolls are mounted, a drive shaft, means for connecting either of the shafts of said pair to said drive shaft, a second pair of rolls between the disks on the other side of the axis thereof the members of said second pair of rolls bearing on each other and on the respective disks, the shafts of the second pair being coaxial respectively with the shafts of the first pair, and gearing connecting one member of the first pair of shafts to the member of the second pair of shafts coaxial with the other member of the first said pair of shafts.

12. In a device of the class described, a pair of coaxial friction disks spaced apart and connected respectively to parts to be driven, a pair of friction rolls between the disks on one side of the axis thereof the members of the pair bearing on each other and on the respective disks, a pair of parallel shafts on which the respective rolls are mounted, a drive shaft, alternative connections between said drive shaft and the shafts of said pair, a second pair of friction rolls similar to the first pair and on the opposite side of the axis of said disks, shafts on which said second pair of rolls are mounted coaxial respectively with the shafts of the first mentioned pair, and gearing for driving coaxial shafts in opposite directions.

13. In a device of the class described, a pair of coaxial disks spaced apart and connected respectively to parts to be driven, a pair of friction rolls 6, 6 bearing upon each other and upon the respective disks, shafts 13, 13$^a$ upon which said rolls are respectively mounted, a drive shaft 23, a gear 24 on said drive shaft, gears 25, 26 loosely mounted on shafts 13, 13$^a$ respectively, clutches 27, 28 for connecting the respective gears to their shafts, a second pair of friction rolls 6$^a$, 6$^a$ similar to the first said pair, shafts 12, 12$^a$ on which rolls 6$^a$, 6$^a$ are respectively mounted, a gear 16 on shaft 13, a gear 17 on shaft 12$^a$, and an intermediate gear 18 meshing with gears 16, 17.

14. In a device of the class described, a pair of coaxial friction disks spaced apart, friction rolls intermediate said disks for driving them in the same direction, means for driving said rolls, independent means for forcing the respective disks toward each other and means common to said independent means for operating them together.

15. In a device of the class described, a pair of coaxial friction disks spaced apart, a pair of friction rolls 6, 6 between said disks and bearing on each other and on the respective disks, shafts 13, 13ª upon which said rolls are axially adjustable, gears 29, 30 on shafts 13, 13ª respectively and meshing with each other, a drive shaft, means for connecting shafts 13, 13ª alternatively with a drive shaft, a second pair of friction rolls 6ª, 6ª between said disks and on the opposite side of the axis thereof from rolls 6, 6, shafts 12, 12ª upon which the last said rolls are axially adjustable, gears 31, 32 mounted on the last said shafts respectively and meshing with each other, and means for simultaneously and equally adjusting the pairs of rolls radially of the disks.

16. In a tractor or the like and in combination with the traction wheels thereof, a pair of friction disks connected to the respective wheels, pairs of friction rolls between said disks and on opposite sides of the axis thereof, the members of each pair of friction rolls engaging each other and the respective disks, and means for driving the rolls.

HARVEY L. FISHER.